March 8, 1932.  A. HANNS  1,848,712
MACHINE FOR MOLDING PLASTIC MATERIAL
Filed Dec. 20, 1928   2 Sheets-Sheet 1
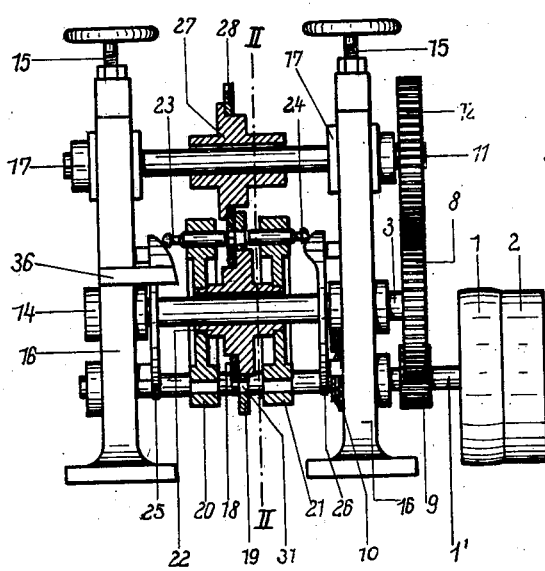
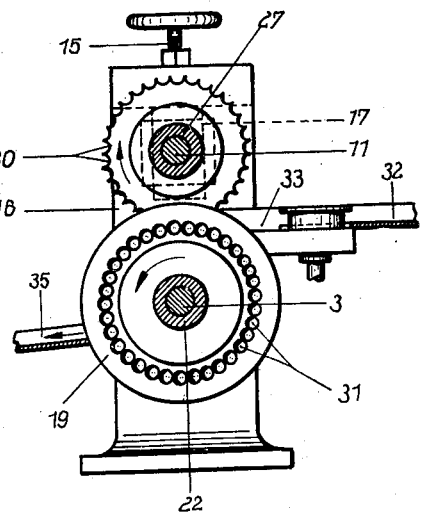
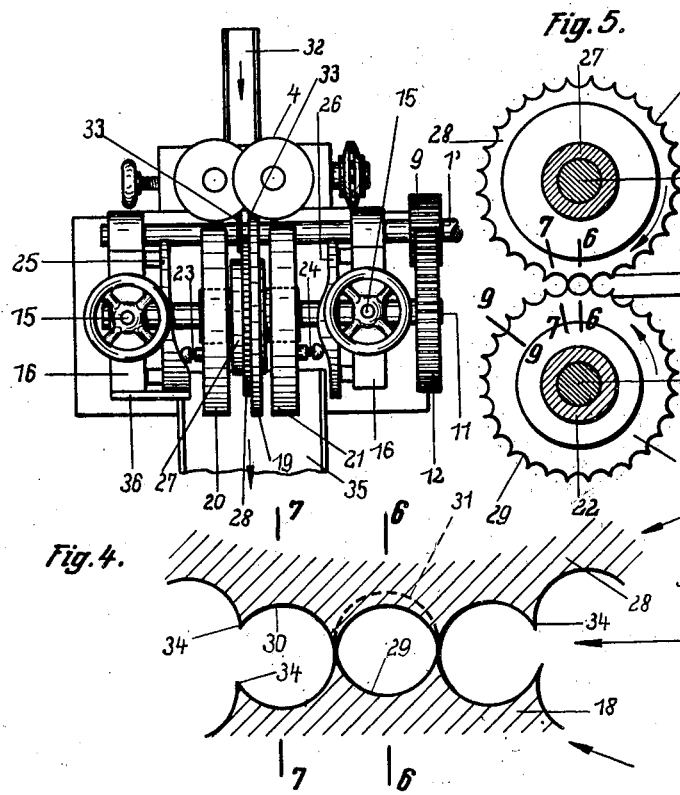
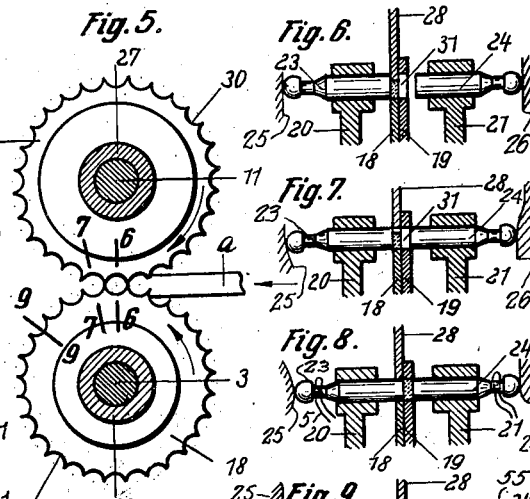
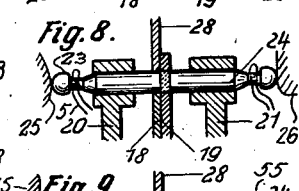
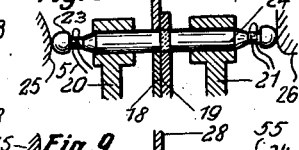
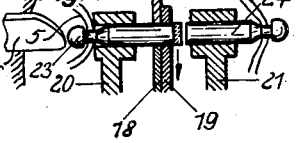
Inventor:
Arthur Hanns
by [signature] Atty.

Inventor:
Arthur Hanns
by
Atty.

Patented Mar. 8, 1932

1,848,712

UNITED STATES PATENT OFFICE

ARTHUR HANNS, OF LEIPZIG, GERMANY, ASSIGNOR TO THE FIRM HANNS & RÖMER, OF LEIPZIG, GERMANY

MACHINE FOR MOLDING PLASTIC MATERIAL

Application filed December 20, 1928, Serial No. 327,262, and in Germany April 3, 1928.

My invention relates to a machine for molding plastic material. It is an object of my invention to provide a machine of this kind in which formation of burr and loss of material are absolutely prevented, the material being subdivided into blanks, the blanks molded, marked and ejected in a single operation.

To this end I provide serrated cutters to which a supply of material is fed for subdivision into blanks, means for moving each blank into a perforation of a receiver, for compressing the blank in the perforation, for marking it, if desired, and for ejecting the finished article from the machine.

A machine for making lozenges from caramel, obtained by heating sugar, will be described hereinafter, but I do not wish to be limited to any particular material nor to the manufacture of lozenges of substantially cylindrical shape but in accordance with my invention articles of any shape or section may be made from any plastic material.

It has already been proposed to manufacture articles of this kind by means of cutters having semi-circular circumferential serrations and two guides which are spaced apart the size of the articles, but in this machine the articles, while being molded, cannot be marked and besides the formation of burr is inevitable even if all the parts of the machine cooperate exactly.

In the drawings affixed to this specification and forming part thereof a machine embodying my invention is illustrated diagrammatically by way of example in various stages of operation.

In the drawings

Fig. 1 is an elevation, partly in section through the axes of the cutters,

Fig. 2 is a section on the line II—II in Fig. 1,

Fig. 3 is a plan view,

Fig. 4 illustrates on a larger scale some serrations in the cooperating cutters, Fig. 5 is an elevation showing the cutters separately, Figs. 6 to 9 are sections illustrating four stages of operation.

Figure 10:
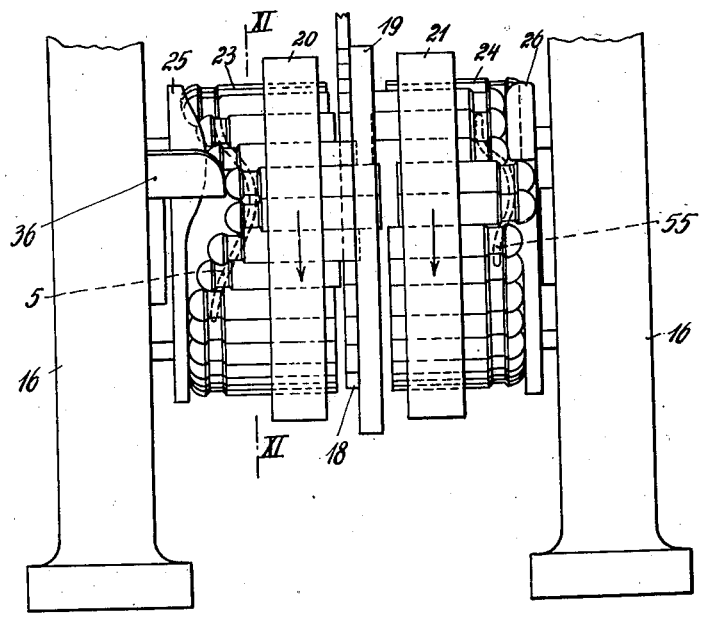
Fig. 10 is an elevation showing the central portion of Fig. 1, drawn to a larger scale.

The machine and its operation will first be described in a general way. $a$ (Fig. 5) is a supply of the material to be treated, such as caramel, which is delivered to the machine along a channel or other suitable guide 32, 4 is an equalizing appliance of known type by which the supply is shaped into a section in proportion to the size of the finished articles which section in the present instance is rectangular, and 18 and 28 are cooperating cutters on parallel shafts 3 and 11, respectively, such cutters being also old in the art. The cutters are provided with circumferential serrations or recesses 29 and 30, respectively, and ridges 34 between the serrations, the serrations being so formed as to constitute a mold of substantially the size of the finished article when two of them meet in the central plane of the machine as shown at 6—6 in Fig. 4, and 19 is a receiver arranged in the immediate vicinity of the lower cutter 18 and provided with circular perforations 31 in line with the serrations in both cutters. The serrations 29 in the lower cutter 18 are semi-circular and coincide exactly with the lower part of each corresponding perforation 31 in the receiver 19, the serrations 30 in the upper cutter 28 are also curved on arcs of a circle like those of the lower cutter but are not quite semi-circular so that at the point where two serrations meet in the central plane 6—6 the upper edge of the serration 30 in the upper cutter 28 is some distance below that of the perforation 31. Plungers 23 and 24 are provided in supports 20 and 21 at each side of the lower cutter 18 which rotate with the cutter. The plungers are adapted to enter the serrations 29, 30 and to penetrate into and to move beyond the perforations 31 in the receiver 19 under the action of stationary cams 25 and 26. They are operated to enter the mold formed by two recesses 29 and 30 when such recesses meet in the central plane of the machine and to extrude the blank in the mold which has been separated from the supply $a$ by the serrations 29, 30 into the adjacent perforation 31 of the receiver 19 where it is compressed by both plungers 23 and 24. During the compression the blank is completely enclosed and formation of burr is absolutely prevented. The end faces of one plunger or of both plungers may be engraved so as to mark one or both faces of the blank. The finished caramel is then pushed out of the perforation 31 by the two plungers acting in unison, and finally is ejected from the machine.

It will be understood from this brief description of the machine that the articles which are made therein will possess a perfect finish without any burr, are absolutely uniform as to size and shape and can be made in much larger quantities per unit of time than in existing machines.

Referring now to Figs. 1, 2 and 3, 16, 16 are the uprights of the machine, 1 and 2 are fast and loose pulleys on a shaft 1' on which a pinion 9 is keyed, and 8 is a gear on the shaft 3 of the lower cutter 18 which is meshing with the pinion 9 and also with a gear 12 on the shaft 11 of the upper cutter 28. Preferably the gears 8 and 12 are of equal diameter so that the driving mechanism is simplified. 10 is a chain drive from the shaft 1' to a layshaft from which the equalizing appliance 4 is operated by suitable gearings which have not been illustrated because, as mentioned, the equalizing appliance is old. The lower shaft 3 is carried in fixed bearings 14 in the uprights 16 of the machine while the upper shaft 11 is carried in bearing blocks 17 which may be adjusted by threaded spindles 15 so that the serrations of the cutters may be placed into the desired relative position very exactly within the limits permitted by the meshing of the gears 8, 12. The cutters 18 and 28 are secured on suitable sleeves 22 and 27, respectively, on their shafts 3 and 11, the receiver 19 and the two supports 20 and 21 for the plungers 23 and 24 being also keyed on the sleeve 22. The cams 25 and 26 are secured to the uprights 16, 16 at each side of the supports 20, 21.

Figure 11:
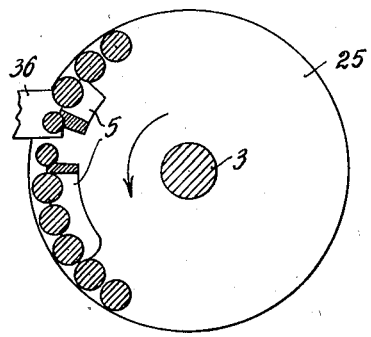
Fig. 11 is a section on the line XI—XI in Fig. 10.

As best seen in Figs. 10 and 11 the cams 25 and 26 are irregular at the faces which engage the plungers 23 and 24, respectively, and guiding strips 5 and 55 are arranged for co-operation with the respective cams 25 and 26 which are connected to the uprights of the machine by any suitable means, such as stays or the like, not shown. In addition, a cam 36 is combined with the cam 25. The guiding strips 5 and 55 are adapted to engage the recessed necks of the plungers 23 and 24 and as the strips 5 and 55 are curved the plungers are displaced axially when engaged by the strips while rotating with the supports 20 and 21 in the direction of the arrows in Figs. 10 and 11.

Both cutters 18 and 28 rotate in the same plane. As mentioned the serrations 29 and 30 in the cutters are not identical, the serrations 29 being complete semi-circles registering with the perforations 31 in the receiver 19 while the serrations 30 in the cutter 28 are not quite semi-circular but are more shallow than the recesses 29 so that two recesses meeting in the central plane of the machine do not constitute a complete circle, as will appear from the position 6—6, Fig. 4. The perforations 31 in the receiver 19 are complete circles. The perforations 31 have been shown in close vicinity and almost tangent to each other in Fig. 2 but this showing is only conventional on account of the small scale of this figure, and in fact webs are left standing between each two perforations. It will be understood that there are as many pairs of plungers as there are perforations 31, and that in all pairs the axes of the two plungers coincide exactly with the axis of the corresponding serration 29 and the corresponding perforation 31. Only one pair of plungers has been illustrated in Fig. 1, for example.

33, 33 are guiding strips by which the supply $a$ is supported on its way to the cutters from the appliance 4, the strip 33 at the right as viewed in the direction in which the supply is conducted into the machine as indicated by the arrow on the channel 32 in Fig. 3, extending inwardly beyond the circumference of the cutter 28 as will appear from Fig. 3, and the strip at the left abutting against the edge of the receiver 19, as shown in Fig. 2. 35 is a tray for the reception of the finished lozenges.

The operation of this machine is as follows:—

The supply of caramelized sugar or other material $a$ is fed continuously along the channel 32, molded into a bar of square section by the equalizing appliance 4, and enters the gap of the cutters 18 and 28 between the strips 33, 33. The ridges 34 gradually penetrate into the advancing bar shown in Fig. 4 and finally the ridges of two recesses abut and separate a blank from the supply, position 6—6. The mold made up by two recesses 29 and 30 at this point is not a full circle but a shape consisting of a complete semi-circle and an arc which is not quite semi-circular. The corresponding position of the plungers 23, 24 and the positions of the plungers with respect to the controlling parts 25, 36, 5, and 26, 55 are shown in Fig. 6, and several consecutive stages are illustrated in Figs. 7, 8 and 9. In the position illustrated in Fig. 6, the plunger 23 has been advanced by its cam 25 into contact with the blank while the plunger 24 is still retracted. The mold with the blank therein now moves into the position 7, 7 in which the ridges 34 separate at the outer end of the mold. The plunger 24 is moved into the perforation 31 as shown in Fig. 7 while the plunger 23 remains stationary. The perforation is now closed at one side by the plunger 24 but still open toward the mold on the side of the plunger 23. After the plunger 24 has been advanced so as to close the perforation 31, the plunger 23 is also advanced so that the blank is pushed into the perforation 31 and compressed by the two plungers, Fig. 8. In this position the plungers are engaged by the strips 5 and 55, respectively. Any markings, decorations, inscriptions, etc. on the faces of one or both plungers will now be copied on the corresponding face or faces of the blank. Upon further rotation of the cutters the plunger 24 is retracted rapidly by its strip 55, Fig. 9 while the plunger 23 follows more slowly under the action of the cam 36 so that the finished lozenge is first extruded from the perforation 31 by the plungers and then released by the more rapidly retracted plunger 24 so that it is free to drop onto the tray 35. The plungers may be removed from their holes in the support 20, 21 after the cam part 36 has been detached so that inspection and repair of the plungers are facilitated.

If the mold constituted by the recesses 29, 30 in the central position 6—6, were circular the blank, being somewhat resilient, would jam at the edges of the perforation 31 when being pushed into the perforation by the plunger 23 causing the formation of burr with corresponding loss of material, and, perhaps, giving other trouble. As it is, however, a crescent-shaped volume is not occupied by the blank when it enters the perforation 31, as shown in dotted lines for the position 6—6 in Fig. 4. This unoccupied volume is filled in when the blank is compressed between the plungers, Fig. 8, so that the blank is finished exactly into the desired shape without any loss of material, and its contours are clearly defined.

It will be understood that this machine operates continuously as long as it is supplied with material and therefore its output will be much higher than the output of existing machines which are operated intermittently.

I wish it to be understood that I do not desire to be limited to the exact details of construction shown and described for obvious modifications will occur to a person skilled in the art.

I claim:—

1. A machine for molding plastic material comprising a pair of circumferentially serrated cooperating cutters, means for rotating said cutters, a receiver secured to one of said cutters and having perforations in line with the serrations in the cutter to which said receiver is secured, a plunger at each side of said cutters, and means for controlling said plungers so as to first move a blank from one of said serrations into the corresponding perforation, compress it therein and eject it therefrom.

2. A machine for molding plastic material comprising a pair of shafts, means for rotating said shafts, a sleeve on one of said shafts, a circumferentially serrated cutter and a receiver on said sleeve, said receiver having perforations in line with the serrations in said cutter, a cutter on said other shaft adapted to cooperate with said cutter on said sleeve, a plunger at each side of said cutters, and means for controlling said plungers so as to first move a blank from one of said serrations into the corresponding perforation, compress it therein and eject it therefrom.

3. A machine for molding plastic material comprising a pair of cooperating cutters, means for rotating said cutters, means for supplying plastic substance to said cutters, means for removing the blanks from said cutters, a receiver adjacent one of said cutters and having circular perforations, said cutters having serrations curved on arcs of a circle, the serrations in that cutter which is combined with said receiver being semicircular and being in line with said perforations in said receiver and the serrations in the other cutter being smaller than semicircles.

4. A machine for molding plastic material comprising a pair of cooperating circular cutters having circumferential serrations adapted to form cavities for the reception of the blanks severed from the plastic material, means for rotating said cutters, means for supplying plastic material to their serrations, molding means, and means for presenting the blanks from said cutters to said molding means, the radial depth of the serrations in one of said cutters being equal to the corresponding dimension of the article after it has been finished by said molding means, and smaller than this dimension in the other cutter.

In testimony whereof I affix my signature.
ARTHUR HANNS.